US008838775B2

(12) United States Patent
Sivakumar (10) Patent No.: US 8,838,775 B2
(45) Date of Patent: Sep. 16, 2014

(54) RELEASE OF RESOURCES IN A COMMUNICATION SYSTEM

(75) Inventor: Tatikonda Sivakumar, Tokyo (JP)

(73) Assignee: Nokia Corporation, Espoo (FI)

( * ) Notice: Subject to any disclaimer, the term of this patent is extended or adjusted under 35 U.S.C. 154(b) by 1328 days.

(21) Appl. No.: 12/075,318

(22) Filed: Mar. 10, 2008

(65) Prior Publication Data
US 2008/0225843 A1 Sep. 18, 2008

(30) Foreign Application Priority Data

Mar. 12, 2007 (EP) .................................. 07251016

(51) Int. Cl.
G06F 15/173 (2006.01)
H04W 4/00 (2009.01)
H04L 12/28 (2006.01)
H04W 76/06 (2009.01)

(52) U.S. Cl.
CPC .......... H04W 76/062 (2013.01); H04W 76/068 (2013.01)
USPC ............................ 709/224; 370/328; 370/389

(58) Field of Classification Search
USPC ................................... 709/224; 370/328, 389
See application file for complete search history.

(56) References Cited

U.S. PATENT DOCUMENTS

| 2002/0089942 | A1* | 7/2002 | Seppa et al. ................. | 370/310 |
| 2004/0174838 | A1* | 9/2004 | Sillasto ........................ | 370/328 |
| 2006/0176845 | A1* | 8/2006 | Sarkkinen ..................... | 370/328 |
| 2007/0177628 | A1* | 8/2007 | Choi et al. .................... | 370/469 |
| 2008/0101312 | A1* | 5/2008 | Suzuki et al. ................. | 370/342 |

FOREIGN PATENT DOCUMENTS

| WO | WO 02/32084 A2 | 4/2002 |
| WO | WO 03/013165 A1 | 2/2003 |
| WO | WO 03/096730 A1 | 11/2003 |

OTHER PUBLICATIONS

3GPP TR 25.813, V7.0.0 (Jun. 2006), XP-002426125, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), 39 pgs.

3GPP TR 25.913, V7.3.0 (Mar. 2006), 3rd Generation Partnership Project; Technical Specification Group Radio Access Network; Requirements for Evolved UTRA (E-UTRA) and Evolved UTRAN (E-UTRAN); (Release 7), 18 pgs.

* cited by examiner

Primary Examiner — Viet Vu
Assistant Examiner — Herman Belcher
(74) Attorney, Agent, or Firm — Harrington & Smith (57) ABSTRACT

A control mechanism for a packet data system is disclosed. The control mechanism includes a control entity configured to detect a defined period of inactivity on a packet data context for carrying packet data. A procedure for releasing resources associated with the packet data context are triggered in response to detection of the defined period of inactivity.

26 Claims, 4 Drawing Sheets

RELEASE OF RESOURCES IN A COMMUNICATION SYSTEM

CROSS-REFERENCE TO A RELATED APPLICATION

This US Patent Application claims priority from European Patent Application No.: 07251016.7, filed Mar. 12, 2007.

BACKGROUND OF THE INVENTION

1. Field of the Invention

The present invention relates to certain entities for a communication system and in particular to release of resources after termination of a data flow in a communication system.

2. Description of the Related Art

A communication system is a facility which facilitates communication between two or more entities such as communication devices, network entities and other nodes. A communication system may be provided by one more interconnect networks. One or more gateway nodes may be provided for interconnecting various networks of the system. For example, a gateway node is typically provided between an access network and other communication networks, for example a core network and/or a data network. The communication may comprise, for example, communication of data for carrying communications such as voice, electronic mail (email), text message, multimedia and so on.

A user may communicate via a communication system and access various applications by means of an appropriate communication device. An appropriate access system allows the communication device to access to the communication system. An access to the communications system may be provided by means of a fixed line or wireless communication interface, or a combination of these. Examples of wireless access systems include cellular access networks, various wireless local area networks (WLANs), wireless personal area networks (WPANs), satellite based communication systems and various combinations of these.

A communication system typically operates in accordance with a standard and/or a set of specifications and protocols which set out what the various elements of the system are permitted to do and how that should be achieved. For example, it is typically defined if the user, or more precisely user device, is provided with a circuit switched bearer or a packet switched bearer, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers can influence the operation of the lower level functions.

In cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network.

A non-limiting example of another type of access architecture is a concept known as long term evolution (LTE). A particular example of such systems is the Evolved Universal Terrestrial Radio Access (E-UTRA). An Evolved Universal Terrestrial Radio Access Network (E-UTRAN) consists of E-UTRAN Node Bs (eNBs) which are configured to provide base station and control functionalities. In these systems various functions that have been conventionally handled based on centralised control can be handled in a distributed manner. This kind of distributed architecture is sometimes referred to as a "flat architecture". For example, the eNBs nodes can provide independently E-UTRA features such as user plane radio link control/medium access control/physical layer protocol (RLC/MAC/PHY) and control plane radio resource control (RRC) protocol terminations towards the user devices.

In the distributed systems, for example those based on the long term evolution concept, communications can be handled based on layer 2 (L2) architecture. A medium access control (MAC) can be employed for providing logical channels for carrying the data traffic flows. Each logical channel is configured with a radio link service profile (RLSP). The profile defines the quality of service (QoS) treatment to be given to data that is queuing in a given logical channel. Only a limited number of logical channels may be available, and thus any unnecessary "open" logical channels should be avoided. It is down to the layer 2 (L2) functional entities determine the termination of the data flows, and to clear the assigned radio link service profiles to enable reuse of the freed logical channels for future traffic flows.

The current L2 architecture presents some challenges due to the distributed nature of functionalities that relate to the logical channels. A logical channel is typically provided by at lest one medium access control (MAC) entity. Any data content therein waiting for transfer is emptied by a packet scheduler. The quality of service (QoS) of a logical channel is configured by a radio resource control (RRC) entity. This can be provided by setting appropriate radio link service profile parameters. Data may be queued into one or more logical channels based on the quality of service requirements of that data flow. For example, in a long term evolution arrangement this function is performed by means of a packet data convergence protocol (PDCP). Hence the determination of the end of traffic flow needs to be a coordinated activity that requires inter-functional messaging. A problem in here is that that the current layer 2 entities do not provide appropriate inter-functional messaging features.

The problem may not exist in the current cellular systems since in these the release and connection closure is initiated typically on a higher level layer wherefrom the closure then propagates to lower level layers and eventually provides functions such as closure of a packet data protocol (PDP) context. This type of release, however, may not always be appropriate in packet data networks and/or distributed systems. For instance, a packet data network may not employ a higher level layer to provide the explicit signaling that might be required for termination of a connection.

Thus there is a problem in relation to clearing resources from various functional entities once data traffic has ended on a logical channel. Also, it might be advantageous in certain situations if the state of the associated functional entities is consistent with respect to the status of the respective logical channel or channels.

SUMMARY

The herein described embodiments aim to address one or several of the above problems.

According to an embodiment, there is provided a control mechanism for a packet data system. The control mechanism comprises a control entity configured to detect a defined period of inactivity on a packet data context for carrying packet data and to trigger a procedure for releasing resources associated with the packet data context in response to detection of the defined period of inactivity.

In accordance with another embodiment there is provided a method in a packet data system, comprising determining at a protocol entity whether a data flow on a packet data context has ended based on detection of a defined period of inactivity of the packet data context, initiating a procedure for releasing packet data resources associated with the packet data context, and signalling instructions to release the packet data context to at least one other protocol entity.

In accordance with a more specific embodiment the control entity comprises a medium layer protocol entity. The medium layer protocol entity may comprise, for example, a medium access control entity. The control entity may comprise at least one timer configured to detect an end of a data packet flow. The control entity may further comprise at least one second timer. The at least one second timer may be configured to start in response to an indication by the at least one first timer, to initiate the procedure for releasing packet data resources after expiry thereof and to restart the at least one first timer in response to detection of activity on the packet data context. The second timer may be configured to be responsive to signalling from a packet data convergence protocol entity.

The protocol entity may be configured to send an indication regarding detected inactivity of a given packet data flow to a packet data convergence protocol entity. The packet data convergence protocol entity may be configured to start a timer and to start release of resources associated with the packet data flow upon expiry of the timer and/or to terminate the procedure for releasing resources by sending a data packet on the packet data context and/or to start release of resources in response to the indication.

The control entity may be configured to trigger a release of resources in a system other than the system where the detection was made.

The control entity may instruct a radio resource control entity to initiate release of resources. The radio resource control entity may instruct a second radio resource control entity to initiate release of resources. The radio resource control entity may also or alternatively terminate the release of resources and to reconfigure resources that are already released.

The control mechanism may be provided and the method may be implemented at a control node for a communication system. The control node may be configured for use in a distributed architecture.

The method may be implemented as a computer program comprising program code means. The software code may be run in a processor for a station of a communication system.

BRIEF DESCRIPTION OF DRAWINGS

For a better understanding of the present invention and how the same may be carried into effect, reference will now be made by way of example only to the accompanying drawings in which.

DESCRIPTION OF CERTAIN EMBODIMENTS

Figure 1:
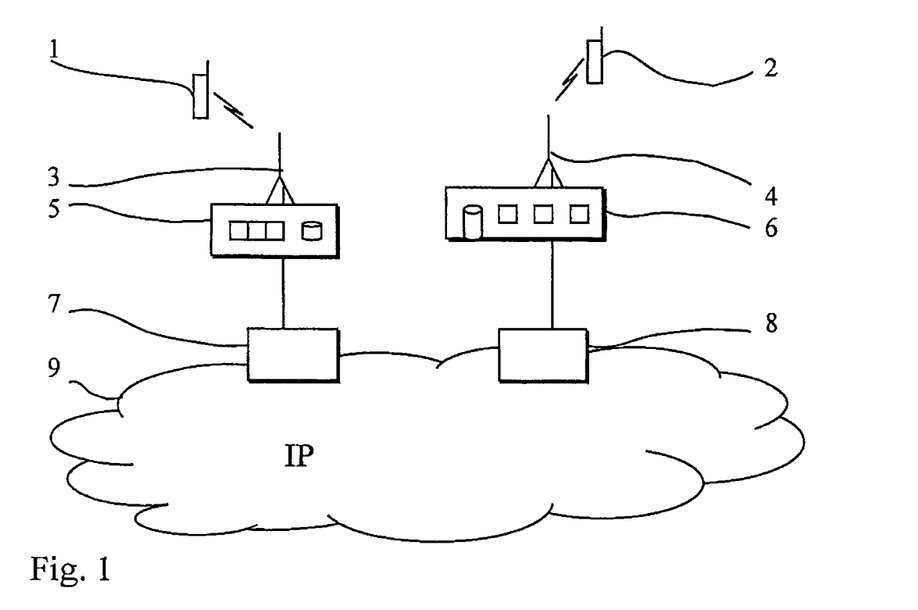
FIG. 1 shows a schematic presentation of a communication system wherein the invention may be embodied.
Figure 2:
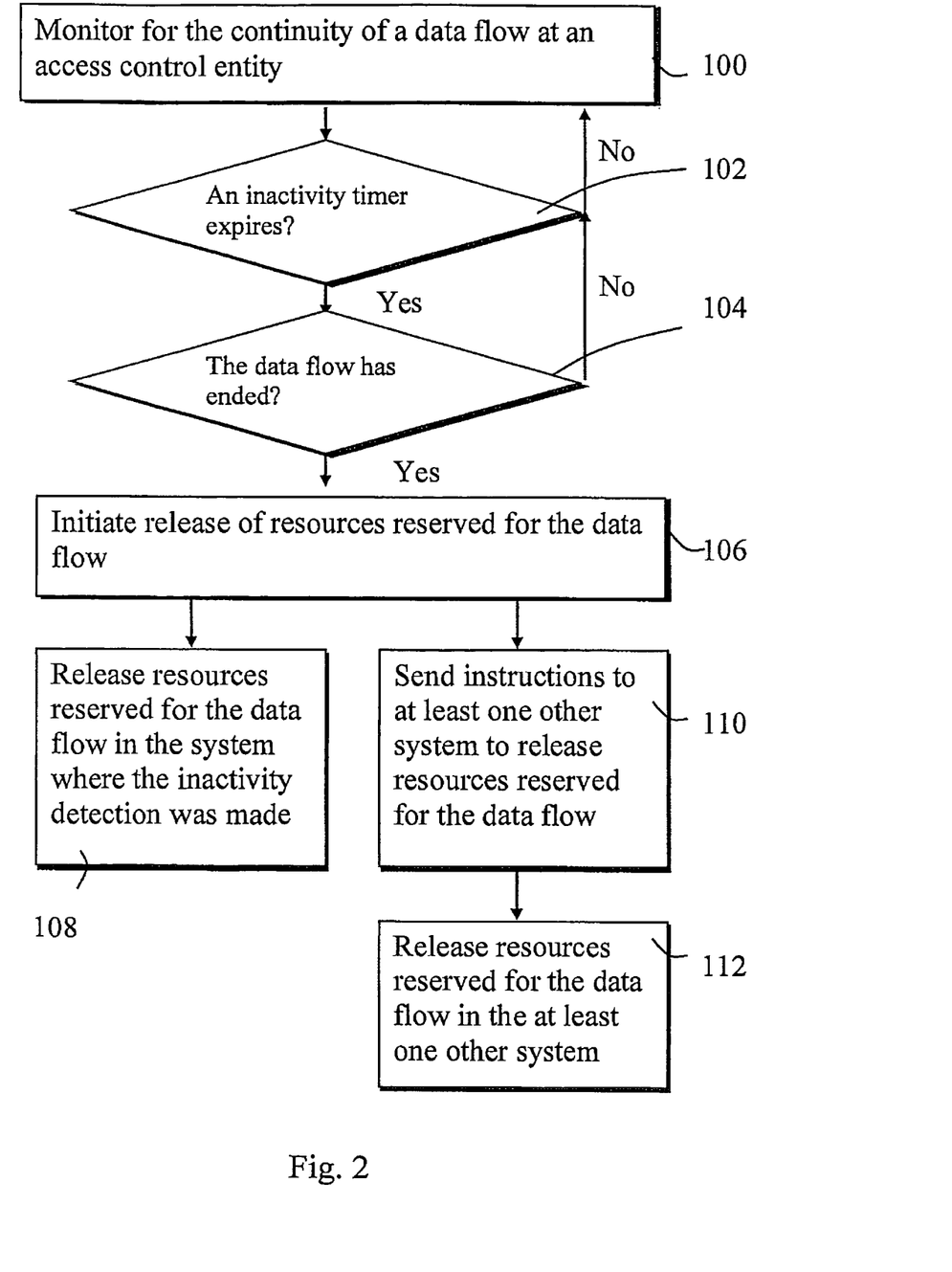
FIG. 2 shows a flowchart in accordance with an embodiment.

Before explaining in detail a few exemplifying embodiments, a brief explanation of certain general principles of wirelessly accessing a communication system is given with reference to FIGS. 1 and 2.

A communication device, for example a user device, can be used for accessing various services and/or applications provided via a communications system. In wireless or mobile systems the access is provided via an access interface between a user device 1, 2 and an appropriate wireless access system. The user device can typically access wirelessly a communication system via at least one base station 3, 4 or similar wireless transmitter and/or receiver node. Non-limiting examples of access nodes are a base station of a cellular system and a base station of a wireless local area network (WLAN). Each user device may have one or more radio channels open at the same time and may be connected to more than one base station.

In FIG. 1 the base station nodes 3 and 4 are connected to the data network 9 via appropriate gateways 7 and 8, respectively. A gateway function between a base station node and another network may be provided by means of any appropriate gateway node, for example a packet data gateway and/or an access gateway.

A base station is typically controlled by at least one appropriate controller entity, generally denoted by 5 and 6 in FIG. 1. The controller entity can be provided for managing of the overall operation of the base station and communications via the base station. The controller entity is typically provided with memory capacity and at least one data processor. Functional entities such as those referred to by numerals 10 to 15 in FIG. 3 may be provided in the controller by means of the data processing capability thereof. The functional entities provided in the base station controller may provide functions relating to radio resource control, access control, packet data context control and so forth.

FIG. 1 shows in particular evolved radio access systems that are connected to a packet core system 9. Such an access system may be provided, for example, based on architecture that is known from the Evolved Universal Terrestrial Radio Access (E-UTRA) and base on use of the Evolved Universal Terrestrial Radio Access Networks (E-UTRAN) Node Bs (eNBs). It is noted, however, that FIG. 1 shows this architecture only to give an example of a possible communication system where the embodiments described below may be provided and that other arrangements and architectures are also possible. For example, at least one of the user devices 1 and 2 may access the system via a different access system.

Data can be carried on what is known as logical channels. Resources known as a packet data context can be associated with each logical channel. Each logical channel can be supposed to contain a data flow that can be controlled by an appropriate control arrangement. It shall be appreciated that a data flow referred herein can be a multiplexed combination of several data flows, but nevertheless it can be understood to be, from control point of view, a single data flow.

The user device 1, 2 can be used for various tasks such as making and receiving phone calls, for receiving and sending data from and to a data network and for experiencing, for example, multimedia or other content. For example, a user device may access applications provided via a data network 9. For example, various applications may be offered in a data network that is based on the Internet Protocol (IP) or any other appropriate protocol. An example of such applications is a voice call via the IP data networks, known as Voice over the Internet (VoIP). An appropriate user device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. A user device is typically provided with at least one data processing entity and at least one memory for use in tasks it is designed to perform. The data processing and storage entities can be provided on an appropriate circuit board and/or in chipsets.

In an embodiment protocol resources associated with a packet data flow are released based on monitoring for an indication that data flow on a logical channel may have ended. Indication may be detected by an appropriate protocol entity, for example by an access control entity or a packet data context control entity. Once it is determined that the data flow may have ended, release of the associated resources may be based on higher-layer signaling and/or appropriate inactivity timers.

For example, one or more timers may be provided to detect and implement a data flow termination detection process and a related context clearance process. The timers can be used to trigger various interlayer signaling procedures thus enabling exchange of termination signaling information with peer entities. A plurality of timers and/or timer values may be provided at the medium access control (MAC). For example, a first timer may be configured to detect a flow termination process and a second timer may be configured to trigger communication of information about the detection to other functional entities and clearing of the resources reserved by the context.

At least one of the timer functions may be provided in the distributed base station, for example an eNB. In certain applications at least one timer function may be provided in a user device.

An exemplifying embodiment is now described with reference to the flowchart of FIG. 2. In this embodiment a medium access control entity is provided with a timer function to enable monitoring for a predefined period of inactivity on a given channel at 100. If such a period is detected at 102, it may then be determined at 104 whether the data flow has ended or if there another reason for the inactivity indication and therefore the data flow may not have ended.

A determination at 104 that a defined period of inactivity has indeed occurred triggers a procedure at 106 to release packet data resources associated with the packet data flow on a logical channel. Resources reserved for the data flow at the system where the detection was made may then be provided at 108, i.e. in the system of the access control entity.

At least two different communication network systems may be involved in the packet data flow. Hence resources may need to be the released in at least one other system in addition to release of resources at 108 in the system where the detection was made. Inter-system signalling may be provided at 110 for initiating a resource release procedure in the at least one other system. Upon receipt of the release instructions, resources associated with the packet data context carrying the ended data flow are released also at the at least one other system at 112.

The timers associated with detection and signaling may be set to have various values. For example, a first timer may be configured to monitor for termination of a medium access control (MAC) dataflow, and hence the timer value thereof may be called a medium access control (MAC) dataflow termination timer value. This value can be provided by means of a timer parameter associated with a logical channel identity (LCID)—the radio link service profile (RLSP) pair and may be provided either in the radio link service profile (RLSP) or as a logical channel identity (LCID) buffer timer. A logical channel identity is usually used as a proxy for a logical channel. A radio link service profile, in turn, may contain QoS parameters of a logical channel and provides control information about how to treat data in a given logical channel. The RLSP may thus provide the threshold value for the timer operation. If the first timer value is provided by the radio link service profile (RLSP), the timer value may be maintained on per LCID basis. For example, if a radio link service profile is associated with more than one logical channel identity, then the radio link service profile has this timer parameter for each of the logical channel identities it is associated with.

An appropriate value for the medium access control dataflow termination timer value may be defined based on various underlying parameters and objectives. A radio link service profile that is also defined at the medium layer (for example, L2) may be provided with this additional parameter for each of the logical channel IDs the service profile is associated with. For radio link service profiles that are associated with default logical channel IDs, the value may be set to infinity to reflect the fact that the data flow over associated logical channel IDs never terminates. Similarly radio link service profiles of data flows whose termination needs to be determined by explicit signaling across applications, or session controllers, may also have the timer value that is set to a relatively high value.

Although the timer should in most applications not run for infinity the value thereof should nevertheless be selected to be high enough so as to prevent false detection of a flow termination by erratic inter-arrival of data packets. On the other hand, the value should be selected to be low enough to reliably detect a failure in a termination signal. A failure in a termination signal may occur, for example, if the data flow has ended but the signaling that specifies this signaling has not arrived or was not detected by the appropriate entity.

To give a specific example for the value, consider a session initiation protocol (SIP) initiated voice over internet (VoIP) call that may have a detection timer that is set to expire after about one hour or more so that the data link layer resources are not released after only a few minutes of inactivity. Instead, only a relatively long period of inactivity (for example 1 hour) may trigger the release the resources.

For radio link service profiles of data traffic whose termination is not subject to any explicit signaling, the detection timer value may be set to a reasonable value either based on the minimum bitrate, or estimated inter arrival time of the data packets with a scaling factor to guard for the premature declaration of the termination of data flow, or some other process that may include learning or adaptation.

A second timer may be configured to monitor for expiry of a medium access control (MAC) logical channel identity context clearance timer value. A timer running this value can be activated upon expiry of the termination detection timer. The expiration of the second timer may result clearance of all context associated with the logical channel identity at the MAC. In other words, the subject logical channel identity may again be classified as an unassigned logical channel identity.

Alternatively, or in addition, the second timer may be configured to monitor for expiry of a packet data convergence protocol (PDCP) dataflow context clearance timer value. Such timer may be triggered in response to a flow termination indication from a medium access control for a specific logical channel identity. The packet data convergence protocol (PDCP) may then wait for the data that can be transferred over that logical channel identity till this timer expires. After that the packet data convergence protocol (PDCP) context for the flows over that logical channel identity can be are erased.

Whenever a data packet is emptied from a logical channel, a dataflow termination timer of the associated radio link service profile can be renewed. If the timer reaches a threshold value, a flow termination process in the medium access control (MAC) is activated. It is noted that depending on the timer implementation this value may be low, even zero. This process may be utilized in providing clean up operations at the data link layer.

Figure 3:
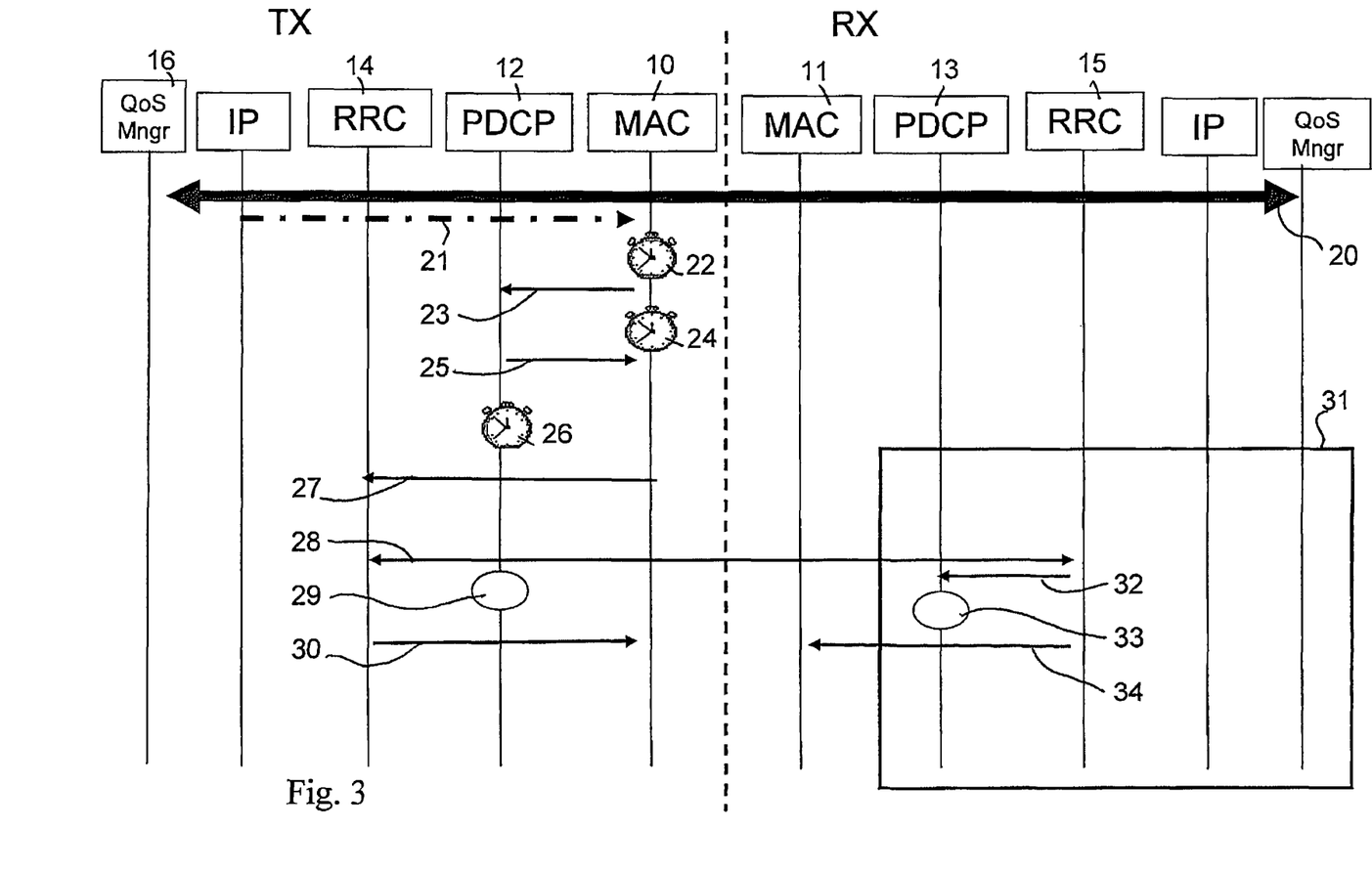
FIGS. 3 and 4 show signalling flow charts in accordance with two specific embodiments.

An example of a termination process is now explained with reference to FIG. 3. FIG. 3 shows a signaling flow for an embodiment wherein traffic flow termination is detection by a medium access control (MAC) entity 10. The medium access control entity 10 is provided on a medium protocol layer, more particularly on layer 2/data link layer (L2).

FIG. 3 also shows subsequent data flow context clearance operations and a radio resource control entity (RRC) initiated flow termination. Certain control and/or protocol entities that are associated with the context are also shown. The access control and packet data control protocol entities 10 and 12 configured to trigger and manage the timers and release are in this example considered to be in a transmitting side. However, similar principles may be applied to the receiver side as well.

Reference 20 in FIG. 3 denotes an existing data traffic that flows over a configured logical channel identity (LCID). Dotted line 21 in FIG. 3 denotes a period when there is no traffic flow for the given configured logical channel identity. An expiry of a dataflow end detection timer 22 may then be interpreted at the protocol entity as an indication that the flow may have been terminated. A flow termination indication may then be sent to a packet data convergence protocol entity 12 by message 23 to indicate that the end of traffic flow is detected by a medium access control timer 22. The indication to the packet data convergence protocol entity 12 includes the logical channel identity. The indication may also include any other relevant parameters that are necessary for the packet data convergence protocol entity 12 to recognize the relevant data flow and the context that is maintained at the packet data convergence protocol entity.

A medium access control logical channel identity context clearance timer 24 may also be started in response to the expiry of the data flow end detection timer 22.

The packet data convergence protocol entity 12 may have data belonging to the identified data flow, or may be otherwise able to determine that the flow termination detection at medium access control entity 10 was premature. In this case the packet data convergence protocol entity 12 may respond by sending either a data packet that is available at packet data convergence protocol or a dummy packet in message 25 over the context identified in the indication in message 23. This packet then renews the dataflow termination timer 22 at the medium access control entity 10, thus terminating the triggered release procedure.

If the packet data convergence protocol entity 12 does not have any data to be sent or cannot justify a decision of non-termination of the data flow, it may start a packet data convergence protocol dataflow context clearance timer 26 thereof. The packet data convergence protocol entity then waits for the expiry of the timer 26. Upon expiry of the packet data convergence protocol dataflow context clearance timer 26, the packet data convergence protocol entity 12 may delete the given data flow context from the packet data convergence protocol entity, see stage 29.

If a medium access control logical channel identity context clearance timer 24 is provided, a receipt of data on the given context before expiry of timer 24 triggers renewal of the detection timer 22. If no data is received before the expiry of timer 24, this triggers sending of a logical channel identity expiry indication 27 to an appropriate radio resource control entity 14.

At this point, the radio resource control entity 14 may in its turn determine that the logical channel identity expired prematurely. In that case the radio resource control entity 14 may reconfigure the logical channel identity (LCID). The radio resource control entity may also reconfigure the packet data convergence protocol entity 12 with appropriate LCID/RLSP information. That is, the radio resource control entity can override the flow termination detection by the timers. If the radio resourced control has a reason to assume that a flow has not ended, it can keep the logical channels configured by reconfiguring appropriate parameters. In effect this provides rolling back the data flow termination process. Otherwise, the radio resource control entity 14 may provide relevant peer to peer signaling, as denoted by 28 in FIG. 3, with a radio resource control peer entity 15 at the other end, in this example at the receiver end, so as to clear the data flow/LCID context from the other end.

Block 31 denotes radio resource control initiated traffic flow termination process and data flow context clearance at the other end. The traffic flow termination process 31 may be initiated by the radio resource control entity 14 in an appropriate manner and the termination may occur, for example, in response to various events. In accordance with a possibility a quality of service (QoS) manager 16 detects that a traffic flow is terminated from explicit signaling involved in the termination of a service. The QoS manager may then send a request to the radio resource control entity 14 regarding traffic flow termination. This explicit signalling by the QoS manager may take place if the occurs before the timers expire. According to the possibility described above the radio resource control entity 14 receives from a network element information regarding termination of a service.

The radio resource control entity 14 may then signal information to a peer radio resource control entity at 28. By message 30 the radio resource control entity can configure the medium access control entity 10 to de-associate the logical channel identity from the current radio link service profile.

In some applications layer 1 (L1; an open system interconnection physical layer) related functions may be invoked. It is noted that if the MAC decides on the multiplexing of logical channels on transport channels, there usually is no need for the change to be propagated to layer 1.

The peer radio resource control entity 15 may send instruction signal 32 to a packet data convergence protocol entity 13 at the other end. The packet data convergence protocol entity 13 may then, upon receiving a traffic flow termination signal from the peer radio resource control entity, clear the packet data convergence protocol context for that traffic flow at stage 33. By message 34 the peer radio resource control entity 15 can configure the medium access control entity 11 of the receiver (RX) side to de-associate the logical channel identity from the current radio link service profile. As above, layer 1 related functions may also be instructed herein, should this be required.

Figure 4:
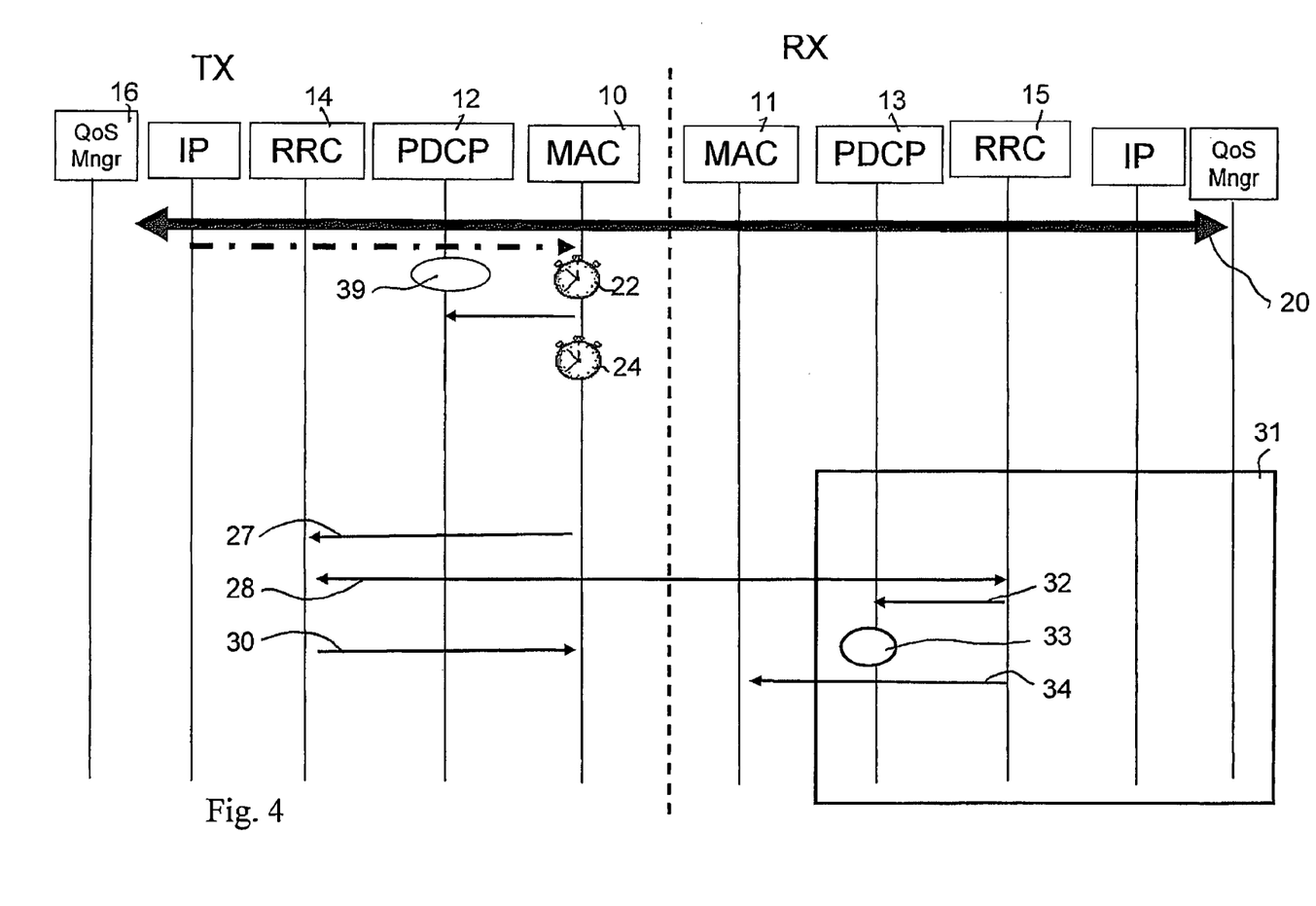

FIG. 4 shows another example wherein a packet data convergence protocol (PDPC) entity 12 initiated traffic flow termination at the transmitter (TX) side is provided. In this embodiment the packet data convergence protocol entity 12 is configured to detect at 39 that the existing data flow on a logical channel identity (LCID) 40 has become inactive, as denoted by dotted line 41. In this case packet data convergence protocol entity may clear the flow context from itself immediately upon the detection at 39. The medium access control entity 10 may wait for the medium access control timers 22 and 24 to expire, and perform the medium access control level flow termination process without intervention from the packet data convergence protocol entity 12. The procedure may them proceed to the release of the associated resources at the other end in similar fashion as described above with reference to stages 27, 28, and 31 to 35 of FIG. 3.

A packet data flow may have been initiated by the network side, for example by one of the eNBs of FIG. 1. For such flows, a user device may not be allowed to delete the corresponding logical channel identities or clear the context associated with the logical channel identities. This may be so, for example, because the network may have some information that may not be compatible with the timer related flow termination. Should this be the case, an appropriate network entity may override the detection by the user device, thus providing a mechanism by which the network is given control over the user device.

The embodiment may provide advantage in view of detecting an end of a traffic flow. Optimized use of resources at a data layer may also be provided.

The required data processing functions and/or protocol entities may be provided by means of one or more data processors. All data processing may be provided in a processing unit provided in an access system, or distributed across several data processing modules. The above described functions may be provided by separate processors or by an integrated processor. An appropriately adapted computer program code product or products may be used for implementing the embodiments, when loaded on an appropriate processor, for example in a processor of an access system controller or a user device. The program code means may, for example, provide any of the timers, perform the generation and/interpretation of information signalled between the various entities and control triggering of various operations. The program code product for providing the operation may be stored on and provided by means of a carrier medium such as a carrier disc, card or tape. A possibility is to download the program code product to the mobile device via a data network.

It is noted that whilst embodiments have been described in relation to user devices such as mobile terminals, embodiments of the present invention are applicable to any other suitable type of apparatus suitable for communication via access systems. Similar principles may be applied to any access technologies where higher level/control signalling may not be available for release of resources.

It is also noted that although certain embodiments were described above by way of example with reference to certain exemplifying architectures for wireless networks, technologies and standards, embodiments may be applied to any other suitable forms of communication systems than those illustrated and described herein. It is also noted that the term access system is understood to refer to any access system configured for enabling wireless communication for user accessing applications.

It is also noted herein that while the above describes exemplifying embodiments of the invention, there are several variations and modifications which may be made to the disclosed solution without departing from the scope of the present invention.

The invention claimed is:

1. An apparatus, comprising:
a processor; and
a memory including computer program code, where the memory and computer program code are configured to, with the processor, cause the apparatus at least to:
implement a control mechanism for a packet data system, said control mechanism comprising a control entity configured to detect a defined period of inactivity on a packet data context for carrying packet data and to trigger a packet data convergence protocol clearance procedure for releasing packet data resources associated with the packet data context in response to the detection of the defined period of inactivity,
wherein the control entity comprises at least one first timer configured to detect an end of a data packet flow on at least one logical channel, and a packet data convergence protocol entity configured to start at least one second timer,
wherein the at least one second timer is configured to start in response to an indication by the at least one first timer, and wherein the indication comprises logical channel identification of the at least one logical channel,
wherein based on an expiration of the at least one second timer, the packet data convergence protocol entity is configured to initiate the packet data convergence protocol clearance procedure for releasing packet data resources associated with the logical channel identification, and
wherein the at least one first timer is restarted in response to detection of activity on the packet data context.

2. The apparatus as claimed in claim 1, wherein the control entity comprises a medium layer protocol entity, wherein the medium layer protocol entity comprises a medium access control entity associated with triggering the at least one first timer.

3. The apparatus as claimed in claim 1, further comprising, based on the expiration of the at least one second timer, signaling via a communication network a peer device separate from the apparatus to release at the peer device packet data resources associated with the logical channel identification.

4. The apparatus as claimed in claim 1, wherein the second timer is responsive to signalling from the packet data convergence protocol entity.

5. The apparatus as claimed in claim 1, wherein the control entity is configured to send an indication regarding detected inactivity of a given packet data flow to the packet data convergence protocol entity.

6. The apparatus as claimed in claim 5, wherein the packet data convergence protocol entity is configured to terminate the procedure for releasing resources by sending a data packet on the packet data context.

7. The apparatus as claimed in claim 5, wherein the packet data convergence protocol entity is configured to start release of resources in response to the indication.

8. The apparatus as claimed in claim 1, wherein the control entity is, based on an expiration of the at least one second timer, configured to trigger a release of data packet flow context resources in a communication network system other than a communication network system where the detection was made.

9. The apparatus as claimed in claim 1, wherein the control entity is configured to instruct a radio resource control entity to initiate the release of the packet data resources.

10. The apparatus as claimed in claim 9, wherein the radio resource control entity is configured to instruct a second radio resource control entity to initiate release of packet data resources.

11. The apparatus as claimed in claim 9, wherein the restarting comprises the radio resource control entity is configured to terminate the release of the packet data resources and to reconfigure resources that are already released.

12. The apparatus as claimed in claim 1, wherein the control entity comprises a protocol entity configured to function at a protocol layer 2 and wherein the signalling to release the resources is configured to occur on the same protocol layer.

13. A control node for a communication system, the control node comprising a control mechanism as claimed in claim 1, wherein the control node is configured for use in a distributed control architecture.

14. The apparatus as claimed in claim 1, comprising a radio link service profile containing QoS parameters for each logical channel of the at least one logical channel, wherein the radio link service profile provides a threshold value for the at least one first timer based on QoS parameters of the at least one a logical channel.

15. A control node as claimed in claim 14, comprising a node for an evolved universal terrestrial radio access network.

16. A communication system comprising a control mechanism as claimed in claim 1.

17. A communication system comprising a control mechanism as claimed in claim 13.

18. A method, comprising:
determining at a protocol entity whether a data flow on a packet data context of at least one logical channel has ended based on detection of a defined period of inactivity of the packet data context, where detection is based on expiry of at least one first timer;
initiating a packet data convergence protocol clearance procedure for releasing packet data resources associated with the packet data context in response to an the detection of the defined period of inactivity; and
signaling instructions to release the packet data context of the at least one logical channel to at least one other protocol entity, further comprising
starting, with a packet data convergence protocol entity, at least one second timer in response to an indication of an expiry of the at least one first timer, wherein the indication comprises logical channel identification of the at least one logical channel; and
one of initiating the packet data convergence protocol clearance procedure to release packet data resources associated with the packet data context after expiry of the at least one second timer, or restarting the at least one first timer in response to detection of activity on the packet data context before the expiry of the at least one second timer.

19. A method as claimed in claim 18, comprising controlling the at least one second timer in response to signalling from a packet data convergence protocol entity.

20. A method as claimed in claim 18, comprising sending from the protocol entity an indication regarding detected inactivity of a given packet data flow to the packet data convergence protocol entity.

21. A method as claimed in claim 20, comprising sending a data packet on the packet data context from the packet data convergence protocol entity to terminate the release of resources.

22. A method as claimed in claim 18, comprising triggering release of resources in a communication network system other than the communication network system where the detection was made.

23. A method as claimed in claim 18, comprising:
terminating the release of resources; and
reconfiguring resources that are already released.

24. A method as claimed in claim 18, comprising disallowing a user device to release resources reserved for data flows that are initiated by a network entity.

25. A non-transitory computer-readable medium that comprises a computer program, the computer program configured to provide, when executed by a processor, a method comprising
determining whether a data flow on a packet data context has ended based on detection of a defined period of inactivity of the packet data context of at least one logical channel;
initiating, with a packet data convergence protocol entity, a packet data convergence protocol clearance procedure for releasing packet data resources associated with the packet data context; and
signalling, with the packet data convergence protocol entity, instructions to release the packet data context to at least one protocol entity, wherein the instructions comprise a logical channel identification of the at least one logical channel.

26. The non-transitory computer-readable medium as claimed in claim 25, wherein the processor is for a communication device.

* * * * *